US009086182B2

(12) United States Patent
Butler et al.

(10) Patent No.: US 9,086,182 B2
(45) Date of Patent: Jul. 21, 2015

(54) LINE STOP FLANGE

(75) Inventors: Scott A. Butler, Ellicottville, NY (US);
Andrew P. Steffan, Great Valley, NY (US); Michael A. Zampogna, Jr., Bradford, PA (US)

(73) Assignee: Dresser, Inc., Addison, TX (US)

( * ) Notice: Subject to any disclaimer, the term of this patent is extended or adjusted under 35 U.S.C. 154(b) by 291 days.

(21) Appl. No.: 13/563,262

(22) Filed: Jul. 31, 2012

(65) Prior Publication Data
US 2013/0032238 A1 Feb. 7, 2013

Related U.S. Application Data

(60) Provisional application No. 61/515,433, filed on Aug. 5, 2011.

(51) Int. Cl.
*F16L 55/10* (2006.01)
*F16L 55/11* (2006.01)
*F16L 41/16* (2006.01)

(52) U.S. Cl.
CPC *F16L 55/11* (2013.01); *F16L 41/16* (2013.01)

(58) Field of Classification Search
CPC ....... F16L 55/10; F16L 55/11; F16L 55/1125; F16L 55/1108; F16L 55/115; F16L 55/1152; F16L 55/1155; F16L 55/136; F16L 41/16
USPC .................. 138/89, 94; 292/256.67; 285/222; 220/327
See application file for complete search history.

(56) References Cited

U.S. PATENT DOCUMENTS

| | | | | | |
|---|---|---|---|---|---|
| 2,310,351 | A | * | 2/1943 | Bowan et al. | 138/89 |
| 2,771,096 | A | * | 11/1956 | Ver Nooy | 138/89 |
| 3,070,129 | A | * | 12/1962 | Poulallion et al. | 138/89 |
| 3,074,591 | A | * | 1/1963 | Raver | 220/327 |
| 3,350,104 | A | * | 10/1967 | Hynes | 277/323 |
| 3,766,947 | A | | 10/1973 | Osburn | |
| 3,912,221 | A | | 10/1975 | Fenster | |
| 4,144,909 | A | | 3/1979 | Harrison | |
| 4,344,460 | A | | 8/1982 | Galos | |
| 4,466,550 | A | | 8/1984 | Sullivan | |
| 4,513,788 | A | | 4/1985 | Coker | |
| 4,685,706 | A | * | 8/1987 | Kowal et al. | 285/322 |
| 5,018,772 | A | * | 5/1991 | Obermeyer et al. | 292/39 |
| 5,230,539 | A | * | 7/1993 | Olson | 285/323 |
| 5,474,336 | A | * | 12/1995 | Hoff et al. | 285/322 |

(Continued)

FOREIGN PATENT DOCUMENTS

CN 2636046 Y 8/2004

OTHER PUBLICATIONS

Search Report and Written Opinion from corresponding PCT Application No. PCT/US2012/049292, dated Mar. 7, 2013.

(Continued)

*Primary Examiner* — Patrick M Buechner
*Assistant Examiner* — Randall Gruby
(74) *Attorney, Agent, or Firm* — Paul Frank + Collins PC (57) ABSTRACT

A locking mechanism for a stop flange is provided with a screw having a head with at least one circumferential channel, and a screw gasket disposed on the at least one circumferential channel. A bushing receives the head in a cavity that forms a housing for the head and screw gasket. The bushing may be provided with a lip that engages a shoulder on a radial bore in a stop flange.

19 Claims, 5 Drawing Sheets

(56) References Cited

U.S. PATENT DOCUMENTS

| | | | |
|---|---|---|---|
| 5,673,945 A * | 10/1997 | Olson | 285/322 |
| 6,003,557 A * | 12/1999 | Brelig et al. | 138/89 |
| 6,334,634 B1 * | 1/2002 | Osterkil | 285/322 |
| 2010/0175770 A1 * | 7/2010 | Huynh | 138/89 |
| 2014/0361028 A1 * | 12/2014 | Groot | 220/806 |
| 2014/0374421 A1 * | 12/2014 | Mizioch et al. | 220/324 |

OTHER PUBLICATIONS

Unofficial English Translation of Chinese Office Action issued in connection with corresponding CN Application No. 201280037459.8 on Feb. 4, 2015.

* cited by examiner

LINE STOP FLANGE

CROSS-REFERENCE TO RELATED APPLICATIONS

This application claims priority to U.S. provisional application Ser. No. 61/515,433, filed on Aug. 5, 2011, which is herein incorporated by reference in its entirety.

TECHNICAL FIELD

This disclosure generally relates to a line stop flange and in particular to a line stop flange with a locking mechanism.

BACKGROUND

Line stop assemblies have traditionally been used to temporarily prevent fluid flow through a selected pipeline section. For example, line stop assemblies may be used to complete modifications or repairs on a downstream pipeline section. Often, line stop assemblies allow such modifications or repairs to be made without any substantial interruption of service (e.g., flow of fluid, such as gas or liquid, through the pipeline section). Generally, line stop assemblies are implemented by securing a sleeve over a segment of the pipeline. A temporary valve is then installed on a supporting flange extending radially from a saddle of the sleeve. Once the valve is installed, the pipeline can be tapped, and flow may be regulated (e.g., prevented) using the temporary valve. After the necessary modifications or repairs have concluded, the temporary valve can be removed and replaced by a completion plug inserted through an axially extending bore of the supporting flange. A locking mechanism may be installed on the flange to secure the completion plug within the bore.

Conventional line stop assemblies are subject to leakage due to the inadequacy of the seal between components. Additionally, the performance of locking mechanisms disposed in a radial bore of the line stop assembly may be affected if the locking components are not properly aligned (disposed substantially concentric to the radial bore).

BRIEF DESCRIPTION OF THE INVENTION

The disclosure provides a technical solution to the problem of leakage due to the inadequacy of the seal between components, and performance problems due to improper alignment of components.

In accordance with one exemplary non-limiting embodiment, an apparatus has a flange body with a radial bore having a shoulder between a proximate end and a distal end. A bushing is disposed in the radial bore, the bushing having a lip that is disposed in contact with the shoulder.

In another embodiment, a locking mechanism may include a screw having a head with a circumferential channel. A gasket is disposed on the circumferential channel. The locking mechanism includes a bushing having a cavity that receives the head, the cavity forming a housing for the head and the gasket.

In another embodiment, a stop flange may include a flange body having a first longitudinal bore and a radial bore. A securing segment is disposed in the radial bore. A locking mechanism is disposed in the radial bore. The locking mechanism includes a bushing having a proximate end with a cavity and a lip, a screw having a head disposed in the cavity, and a cylinder coupled with the screw and the securing segment.

In the foregoing embodiments, an effective metal-to-metal seal is provided. Additionally, the components of the locking mechanism self-align within the radial bore. Consequently, performance is not degraded as a result of non-concentricity between the radial bore and the components of the locking mechanism.

BRIEF DESCRIPTION OF THE DRAWINGS

Other features and advantages of the present invention will be apparent from the following more detailed description of the preferred embodiment, taken in conjunction with the accompanying drawings which illustrate, by way of example, the principles of certain aspects of the invention.

DETAILED DESCRIPTION OF THE INVENTION

As discussed in detail below embodiments of the present invention provide a line stop flange with a locking mechanism having a metal to metal seal between the flange body and the locking mechanism. The line stop flange provides enhanced performance due to the self-alignment of the locking mechanism with the bore in which the locking mechanism is disposed.

Figure 1:
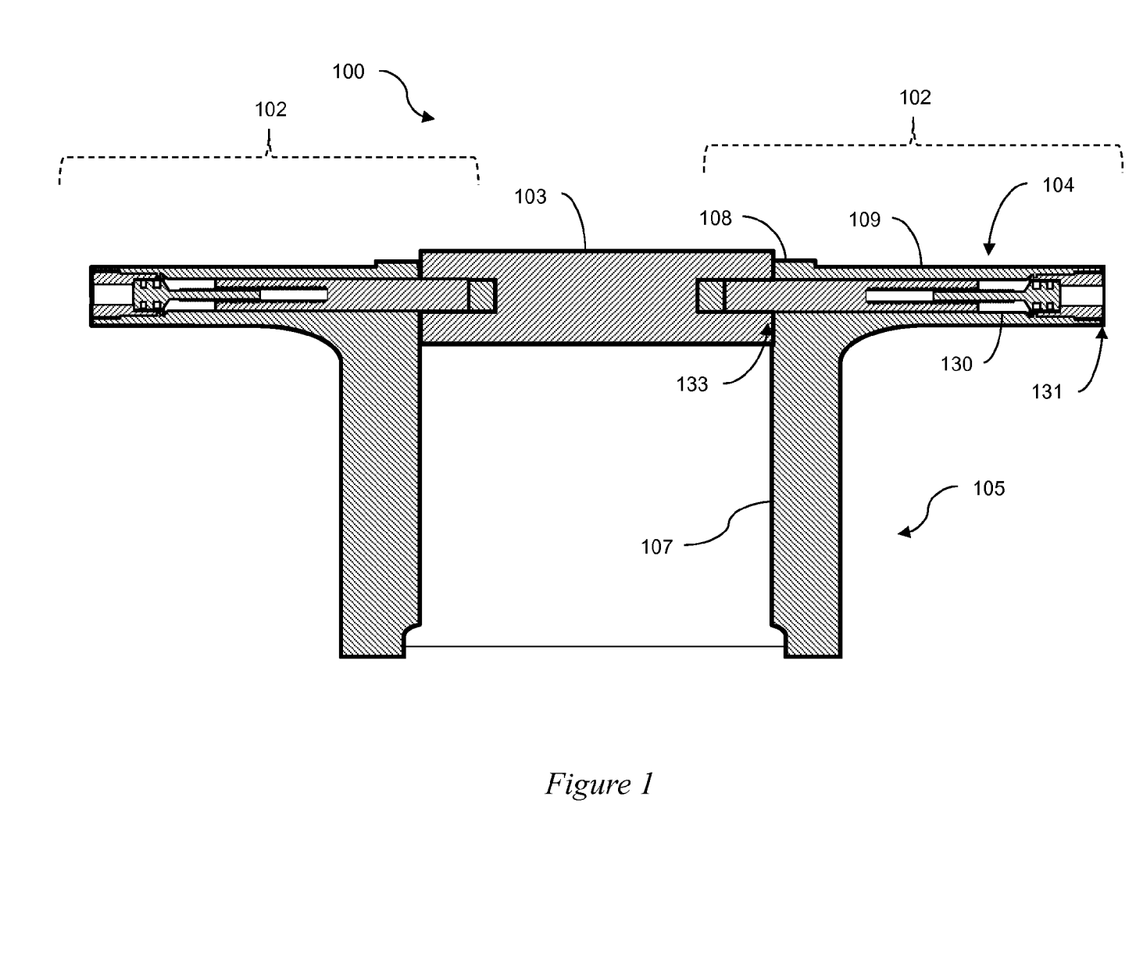
FIG. 1 is a side partial cut away view of an embodiment of a line stop flange.

As shown in FIG. 1, line stop flange 100 includes a flange body 105 and a locking mechanism 102. The locking mechanism 102 may be used to secure a completion plug 103, or other components such as a valve. In this example, exterior and interior surfaces of flange body 105 define a flange face 104, a first bore 107, and one or more radially extending bore(s) (radial bore(s) 130), discussed in detail below). Radial bore(s) 130 are defined by a distal or outboard portion 131 and a proximate or inboard end 133. The locking mechanism 102 is disposed in the radial bore(s) 130 of flange body 105.

Flange body 105 may be fashioned via any suitable method (e.g., casting, forging, machining, welding, and/or any suitable combination of such methods), and from any suitable stock material (e.g., carbon steel, alloy steel, stainless steel, or other suitable material). In some examples, the size, shape, and/or stock material of flange body 105 may be selected based on the intended application of line stop flange 100. For instance, in relatively high pressure applications, it may be advantageous to fashion the flange body 105 from a more durable material and/or to provide the flange body in a larger size (as compared to a similar apparatus for use in relatively low pressure applications).

Figure 5:
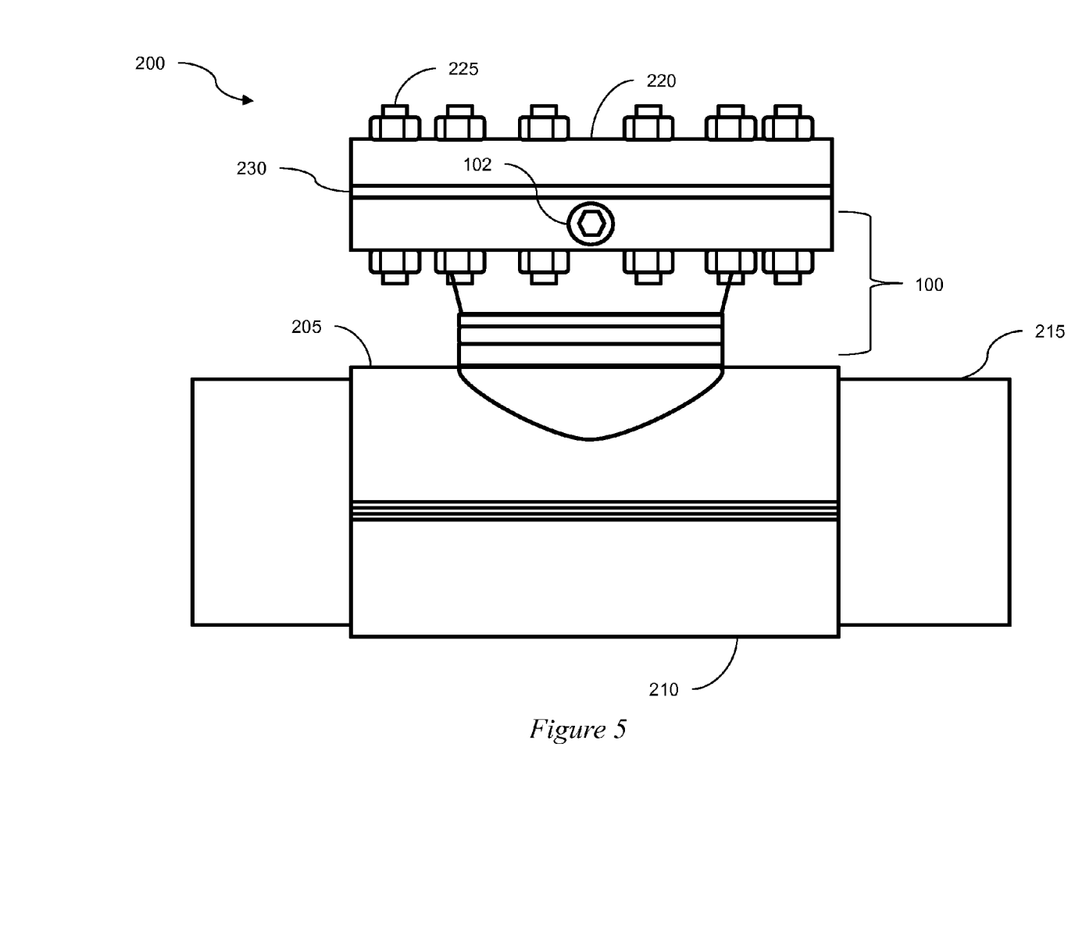
FIG. 5 is a side view of an embodiment of a line stop fitting.

Raised surface 108 and flange face 104 may be configured to form a seal (e.g., a hermetic seal) in conjunction with another, mating flange face or cover plate (see e.g. cover plate 220 shown in FIG. 5), and a suitable flange gasket such as an O-ring gasket or thin metal gasket (gasket 230 shown in FIG. 5). For example, in the illustrated implementation, flange face 104 is provided in the form of a raised face flange having a raised sealing surface 108 and a recessed surface 109 (other suitable flange configurations may also be used, e.g., recessed face flange arrangements, etc.). Raised sealing surface 108, in some embodiments, may be exceptionally smooth or otherwise configured to form a hermetic seal.

Figure 2:
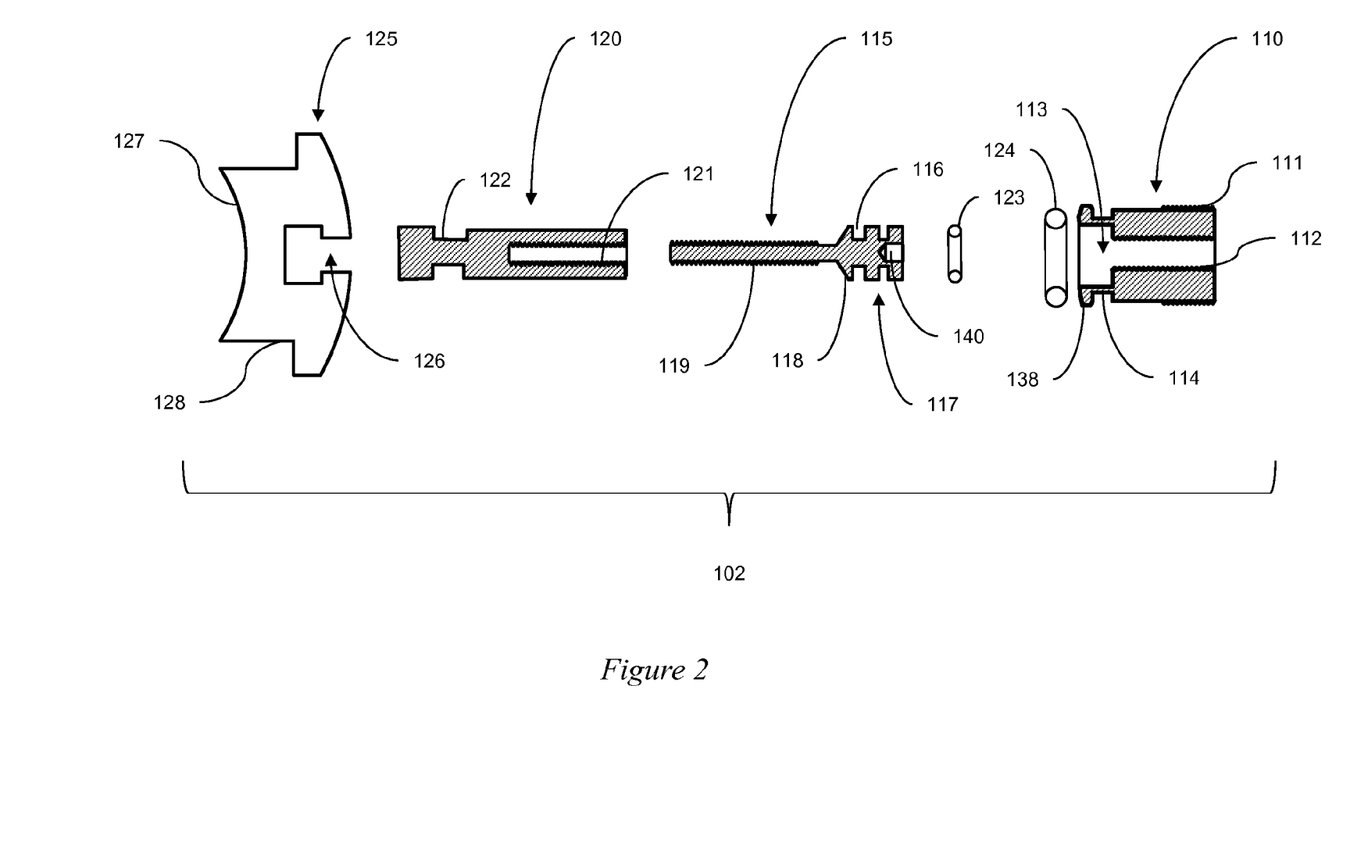
FIG. 2 is an exploded cross-sectional view of an embodiment of a locking mechanism.
Figure 3:
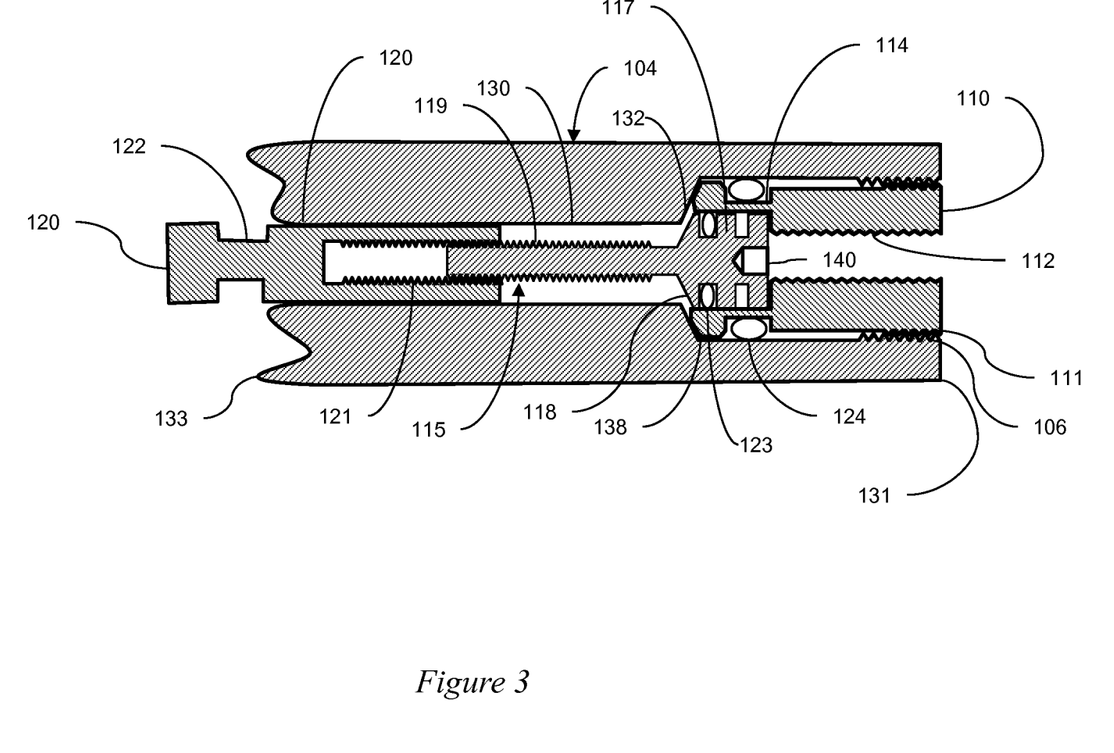
FIG. 3 is a side cross-sectional view of the locking mechanism.

As shown in FIGS. 2 and 3, an embodiment of the locking mechanism 102 includes a bushing 110 disposed at the distal or outboard portion 131 of radial bore(s) 130, a fastener, such as screw 115, a cylinder 120, and a segment 125 disposed at the proximate or inboard end 133 of radial bore(s) 130. Once assembled, bushing 110, screw 115, and cylinder 120 cooperate to adjust the radial position of segment 125 with respect to flange body 105. For example, screw 115 and cylinder 120 are telescopically coupled via a thread engagement such that rotation of the screw 115 in a first direction (e.g., clockwise) causes the cylinder 120 to translate in a radially inboard direction with respect to flange body 105, and rotation of the screw 115 in a second direction (e.g., counterclockwise) causes the cylinder 120 to translate in a radially outboard direction. Screw 115 is held in place by bushing 110 and cooperating portions of flange body 105 (e.g., shoulder 132). Cylinder 120 is coupled to segment 125 such that radial translation of the cylinder 120 causes the segment 125 to move in a radial direction.

As shown in more detail in FIG. 3, bushing 110 is received by the distal or outboard portion 131 of radial bore(s) 130. In this example, bushing 110 is provided in the form of a substantially cylindrical body having an outer threaded surface 111 (exterior thread), a threaded bore 112 having an interior thread, a bushing cavity 113, a channel or circumferential groove 114, and a lip 138 which may be frusto-spherical in shape. Outer threaded surface 111 cooperates with an inner threaded surface 106 of outboard portion 131 to secure bushing 110 within radial bore(s) 130 of flange body 105. Threads, as referenced herein, may be provided in any suitable form or arrangement (e.g., an ANSI unified standard thread arrangement).

Threaded bore 112 may be configured to receive a plug (not shown) for concealing the screw 115, when locking mechanism 102 is assembled. The plug may inhibit ingress of debris, tampering, and/or incidental contact with screw 115 and may provide a secondary pressure seal. Bushing cavity 113 extends from threaded bore 112 and receives a portion of screw 115 when locking mechanism 102 is assembled. The base of bushing cavity 113 provides a seat for the received portion of screw 115 to inhibit radial movement of the screw in the outboard direction.

Referring to FIGS. 2 and 3, in the illustrated implementation, channel 114 is defined by an exterior surface of bushing 110. Channel 114 may receive a bushing gasket 124 (e.g., an O-ring gasket) operable to float within the channel while maintaining contact with the bushing 110 and a surface of radial bore(s) 130. In this way, the bushing gasket 124 provides a secondary seal between bushing 110 and flange body 105. Lip 138 is configured to cooperate with a portion of radial bore(s) 130 such as, for example, shoulder 132 to form a primary seal (a metal-to-metal seal) between bushing 110 and flange body 105. For example, lip 138 may be pressed against a shoulder 132 of radial bore(s) 130 and held under pressure (via cooperation of the inner threaded surface 106 and the outer threaded surface 111) to inhibit leakage. In this implementation, shoulder 132 is provided in the form of a surface angled radially inwards for partitioning an outboard portion 131 of radial bore(s) 130 from an inboard end 133 of the radial bore(s) 130.

In the embodiment illustrated in FIGS. 2 and 3, screw 115 includes a head 117 and a threaded shaft or threaded rod 119. Head 117 is received and secured by bushing cavity 113 of bushing 110, when locking mechanism 102 is assembled. Utilizing bushing 110 to support screw 115 permits the screw 115 (as well as other components of the locking mechanism, such as cylinder 120 and segments 125) to be self-aligned within radial bore(s) 130. Thus, even if screw 115 and radial bore(s) 130 are not concentric, locking mechanism 102 will provide adequate sealing performance.

As shown in FIGS. 2 and 3, head 117 is provided in the form of a substantially cylindrical body. The exterior surface of head 117 includes a number of circumferential channels 116, beveled end surface 118, and a drive cavity 140. Circumferential channels 116 may receive suitable screw gaskets 123 (e.g., O-ring gaskets) maintaining contact with the head 117 and bushing cavity 113. Bushing cavity 113 accommodates the head 117, and serves as the cylindrical housing for the screw gaskets 123. In this way, the screw gaskets 123 provide a seal between screw 115 and bushing 110.

In some implementations, beveled end surface 118 is configured to cooperate with shoulder 132 of radial bore(s) 130 in an abutting fashion. Thus, screw 115 is substantially held in place by securing the head 117 between shoulder 132 and bushing 110 when locking mechanism 102 is assembled and disposed in radial bore(s) 130. Maintaining the screw 115 and bushing 110 in a stationary position provides consistent sealing performance through advancement and/or retraction of segment 125 within radial bore(s) 130. This is important to avoid leakage during the installation and operation of the line stop flange 100, As shown, drive cavity 140 is bored through an end surface of head 117 and may be configured to receive a suitable tool (e.g., slotted, Phillips, or hex key type screw drivers) which tool can be used to rotate the screw 115. In this implementation, head 117 is held in place near the outboard portion 131 of radial bore(s) 130. As such, drive cavity 140 may be readily accessible by a user via standard tooling. Further, in some implementations, the shorter leg of an L-shaped hex key can be used to engage drive cavity 140. Thus, the longer leg of the L-shaped hex key can be grasped by a user to rotate screw 115 with increased mechanical advantage.

Threaded rod 119 of screw 115 is telescopically received by a threaded cylinder bore 121 of cylinder 120. As shown in this example, cylinder 120 is provided in the form of a cylindrical body having exterior and interior surfaces defining the threaded cylinder bore 121, and an indent 122. When locking mechanism 102 is assembled and disposed within radial bore(s) 130, cylinder 120 is engaged (via mating threads of the threaded cylinder bore 121 and threaded rod 119) with screw 115 such that rotation of the screw (which is secured between bushing 110 and shoulder 132) causes the cylinder to translate radially inboard and outboard, with respect to flange body 105.

As shown in FIG. 3, indent 122 is defined by an exterior surface of cylinder 120. When locking mechanism 102 is assembled, indent 122 receives a portion of segment 125, thereby coupling the segment to cylinder 120.

Figure 4:
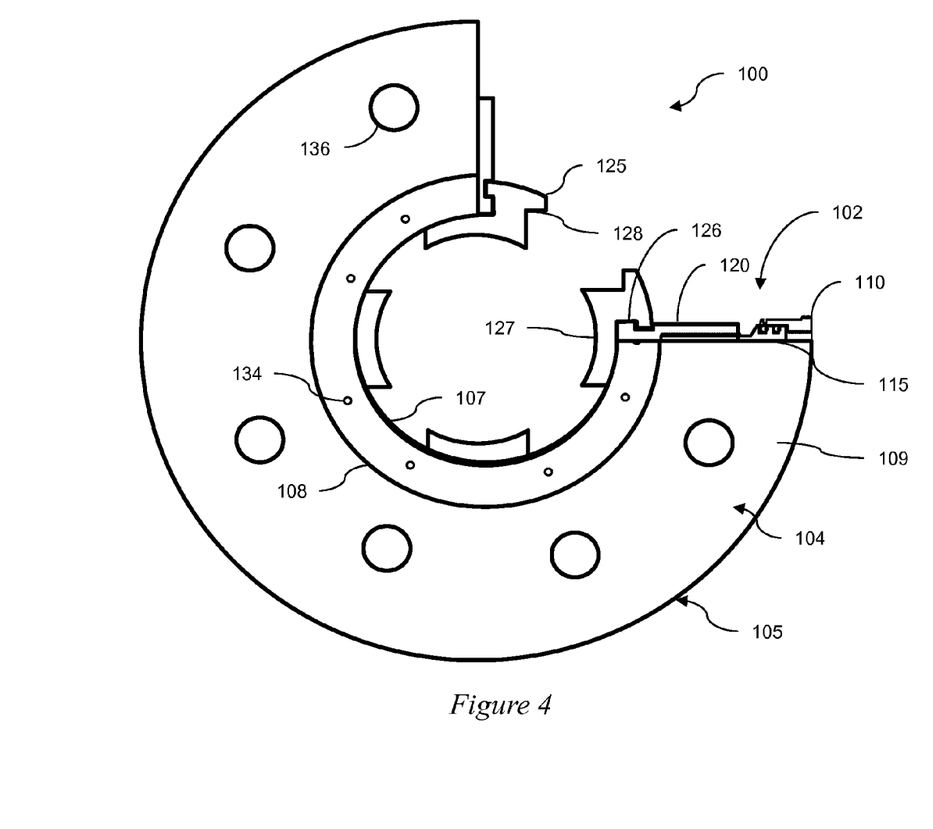
FIG. 4 is a top cross-sectional view of an embodiment of a line stop flange.

FIG. 4 illustrates the placement of the segments 125 in relation to the flange body 105. Segment 125 may be configured to engage the completion plug 103 (shown in FIG. 1) inserted into first bore 107. For example, in this implementation, exterior surfaces of segment 125 define a curved inner surface 127 that abuts to the exterior surface of the completion plug 103 and secures the completion plug 103 in place. In some examples, segment 125 may be inserted into a channel or groove defined by an exterior surface of the completion plug 103. The exterior surfaces of segment 125 also define a slotted opening 126 (best illustrated in FIG. 2) and a number of protrusions 128. As shown, slotted opening 126 cooperates with indent 122 and the body of cylinder 120 to form an interlocking coupling between the cylinder and segment 125. Other means or methods of coupling the cylinder 120 and the segment 125 may also be implemented. For example, a magnetic coupling may be used. As a result of the coupling, radial motion imparted on cylinder 120 by rotation of screw 115 is mimicked by segment 125. In this way, segment 125 can be moved into, or out of, engagement with the completion plug 103.

As shown in FIG. 4, a plurality of circumferentially spaced pin holes 134 are bored into raised sealing surface 108 and extend axially through an inner portion of flange body 105. Pin holes 134 are configured to receive drive pins (not shown) for securing segments 125 of locking mechanism 102. Protrusions 128 interact with drive pins inserted through pin holes 134 of flange body 105. In some examples, the drive pins inhibit (or prevent) segment 125 from being pushed out entirely from radial bore(s) 130 and into first bore 107.

Further, as shown, a plurality of circumferentially spaced bolt holes 136 are bored into recessed surface 109 and extend axially through an outer portion of flange body 105. Bolt holes 136 are configured to receive suitable mechanical fasteners (e.g., bolts or other comparable fasteners) for securing the flange body 105 to a mating flange or cover plate.

FIG. 5 is a side view of an example line stop fitting 200. The line stop fitting 200 may be used to seal an opening tapped into a pipeline 215. As shown, line stop fitting 200 includes a first sleeve portion 205, a second sleeve portion 210, line stop flange 100, and a cover plate 220. As shown, the first sleeve portion 205 and the second sleeve portion 210 form an annular sleeve surrounding a segment of the pipeline 215. In some implementations, first sleeve portion 205 and second sleeve portion 210 may be welded, or otherwise coupled, to pipeline 215. In this example, line stop flange 100 is coupled to (e.g., welded to) first sleeve portion 205. Line stop fitting 200 may be positioned on the pipeline 215 such that a bore of line stop flange 100 (e.g., first bore 107) is aligned and in fluid communication with a tapped opening in the pipeline.

In some implementations, the completion plug 103 may be inserted into the bore of line stop flange 100 and secured by the locking mechanism 102. The completion plug 103 may provide a primary seal of the tapped opening, thereby inhibiting release of any pressurized fluid in the pipeline 215 from the bore of the line stop flange 100. In this example, cover plate 220 is coupled to line stop flange 100 by a set of bolts 225. Other suitable fastening elements or means of coupling the cover plate to the flange may also be used. Cover plate 220 inhibits ingress of debris, tampering, and/or incidental contact with the completion plug 103. In some examples, cover plate 220 may also provide a secondary seal of the tapped opening by forming a hermetic seal with line stop flange 100. For example, a gasket 230 may be inserted between the mating faces of cover plate 220 and line stop flange 100 to form a hermetic seal.

Various implementations of a line stop flange 100 according to the present disclosure may include one or more of the following features and/or advantages. Referring to FIG. 3, for example, primary sealing surfaces can be provided on removable members of the locking mechanism 102 (e.g., bushing 110), as opposed to the flange body 105. As such, manufacturing defects can be remedied by replacing these less expensive members of the assembly. Additionally, components of the locking mechanism 102 will self-align within the radial bore(s) 130. Thus, non-concentricity between the radial bore(s) 130 and the components of the locking mechanism 102 will not degrade performance. Additionally, a metal-to-metal seal between a lip 138 of the bushing 110 and a shoulder 132 of the radial bore(s) 130 can be used to seal the bushing 110 to the flange body 105, as opposed to a pipe thread seal (or other comparable seals). As such, any concentricity requirements may be further diminished.

Referring to FIG. 3, components of the locking mechanism 102 used for sealing (e.g., the screw 115 and the bushing 110) remain substantially stationary within the radial bore(s) 130 during advancement and retraction of the segment 125. Thus, effectiveness of the seals will not vary due to surface or geometry inconsistencies along the length of the radial bore(s) 130.

The head 117 of the screw 115 is maintained at a position near the distal or outboard portion 131 of the radial bore(s) 130. As such, the head 117 is readily accessible to users for advancing and/or retracting the segment 125 within the radial bore(s) 130. Further, certain types of tooling can be used to rotate the screw 115 with increased mechanical advantage (for example, the shorter leg of a standard L-shaped hex key can reach the drive cavity of the head 117).

In addition, various implementations of a line stop flange 100 according to the present disclosure may eliminate or reduce the need for precision machining of a flange body 105 and allow features requiring precision and controlled surface finish to be machined cheaply into smaller pieces of more suitable materials. Further, on smaller, higher precision machinery, the line stop flange 100 may eliminate possible scrap of the large costly flange and improve seal performance (e.g., of a screw 115 and bushing 110 seal). In addition, the line stop flange 100 may facilitate ease of successful assembly and/or forgiveness (or robustness) of the assembly of the apparatus.

Referring to FIGS. 1-4, in operation, screw 115 is secured in place with bushing 110 so that the beveled end surface 118 of screw 115 is in contact with shoulder 132. Additionally, lip 138 of bushing 110 is disposed in contact with shoulder 132 providing a metal to metal seal. Screw 115 may be rotated using an appropriate tool such as a hex key that engages cavity drive 140. As the screw is rotated, bushing 110 and shoulder 132 prevent the lateral displacement of the screw 115 and the threaded rod 119 of screw 115 causes cylinder 120 to move in a radial direction. The radial displacement of cylinder 120 causes segments 125 to move radially to engage and secure completion plug 103.

A number of implementations have been described. Nevertheless, it will be understood that various modifications may be made. For example, line stop flange 100 may include fewer components than those illustrated or more components than those illustrated. In addition, the illustrated components of line stop flange 100 may be arranged in the configurations illustrated, or in different configurations than that illustrated. Accordingly, other implementations are within the scope of the following claims.

The terminology used herein is for the purpose of describing particular embodiments only and is not intended to be limiting of the invention. Where the definition of terms departs from the commonly used meaning of the term, applicant intends to utilize the definitions provided herein, unless specifically indicated. The singular forms "a", "an" and "the" are intended to include the plural forms as well, unless the context clearly indicates otherwise. It will be understood that, although the terms first, second, etc. may be used to describe various elements, these elements should not be limited by these terms. These terms are only used to distinguish one element from another. The term "and/or" includes any, and all, combinations of one or more of the associated listed items. The phrases "coupled to" and "coupled with" contemplates direct or indirect coupling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements.

What is claimed is:

1. A stop flange, comprising:
a flange body having a longitudinal bore and a radial bore;
a securing segment disposed in the longitudinal bore;
a locking mechanism disposed in the radial bore, the locking mechanism comprising:
a bushing having a proximate end with a cavity and a lip;
a fastener having a head disposed in the cavity; and
a cylinder coupled with the fastener and the segment
wherein the fastener further comprises a circumferential channel formed on the head.

2. The stop flange of claim 1, further comprising a gasket disposed in the circumferential channel, the first gasket disposed in contact with a surface of the bushing in the cavity.

3. The stop flange of claim 1, further comprising a gasket disposed between the bushing and the radial bore.

4. The stop flange: of claim 3, wherein the gasket is spaced axially apart from the lip towards the distal end.

5. The stop flange of claim 1, wherein the cylinder extends into longitudinal bore.

6. The stop flange of claim 1, where the cylinder comprises a bore to receive the fastener.

7. A stop flange comprising:
a flange body having a first bore and a second bore extending radially from the first bore:
a securing segment disposed in the first bore:
a locking mechanism disposed in the second bore, the locking mechanism comprising:
a bushing having a proximate end with a cavity and a lip:
a fastener having a head disposed.in the cavity: and
a cylinder configured to couple with the fastener and the segment,
wherein the locking mechanism is configured to form a first annular seal between the bushing and the second bore, and wherein the first annular seal is spaced axially apart from the lip of the bushing, and
wherein the segment is configured with an opening to receive the cylinder therein.

8. The stop flange of claim 7, wherein the second bore comprises a proximate end at the first bore, a distal end, and a shoulder separating the proximate end from the distal end, wherein the locking mechanism is configured with the bushing disposed in the second bore at the distal end, and wherein the locking mechanism is configured to form a second annular seal between the lip of the bushing and the shoulder.

9. The stop flange of claim 8, wherein the lip of the bushing is configured to contact the shoulder to forth the second annular seal.

10. The stop flange of claim 8, wherein the surface of the flange body is angled radially inwards in relation to the second bore.

11. The stop flange of claim 8, wherein the lip has a frusto-spherical shape.

12. The stop flange of claim 8, wherein the locking mechanism is configured to form a third annular seal between the head of the fastener and the cavity.

13. The stop flange of claim 12, further comprising a screw gasket disposed circumferentially about the head of the fastener, wherein the screw gasket is configured to contact the surface of the second bore to form the third annular seal.

14. The stop flange of claim 12, wherein the third annular seal is spaced axially apart from the lip of the bushing.

15. The stop flange of claim 7, wherein the bushing comprises an exterior surface with a circumferential groove disposed at the annular seal.

16. The stop flange of claim 15, further comprising a bushing gasket disposed in the circumferential groove, wherein the bushing gasket is configured to contact a surface of the second bore to form the first annular seal.

17. The stop flange of claim 7, wherein the segment has a protrusion that is configured to engage the cylinder.

18. The stop flange of claim 7, further comprising a drive pin that couples with each of the segment and the cylinder.

19. A stop flange, comprising:
a flange body having a first bore and a second bore extending radially from the first bore;
a securing segment disposed in the first bore;
a locking mechanism disposed in the second bore, the locking mechanism comprising:
a bushing having a proximate end with a cavity and a lip;
a fastener having a head disposed in the cavity; and
a cylinder configured to couple with the fastener and the segment,
wherein the locking mechanism is configured to form a first annular seal between the bushing and the second bore, and wherein the first annular seal is spaced axially part from the lip of the bushing,
wherein the segment has a protrusion that is configured to engage the cylinder, and
wherein the cylinder is configured with an indent that is configure to receive the protrusion of the segment.

* * * * *